United States Patent
Joo et al.

(10) Patent No.: US 8,880,072 B2
(45) Date of Patent: Nov. 4, 2014

(54) APPARATUS AND METHOD FOR SEARCHING FOR AN ALLOWED FEMTOCELL IN WIRELESS COMMUNICATION SYSTEM

(75) Inventors: Yang-Ick Joo, Seoul (KR); Il-Kwon Yun, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 323 days.

(21) Appl. No.: 13/020,978

(22) Filed: Feb. 4, 2011

(65) Prior Publication Data
US 2011/0189998 A1 Aug. 4, 2011

(30) Foreign Application Priority Data
Feb. 4, 2010 (KR) .................. 10-2010-0010312

(51) Int. Cl.
*H04Q 7/00* (2006.01)
*H04W 36/00* (2009.01)
*H04W 24/00* (2009.01)

(52) U.S. Cl.
CPC .............. *H04W 24/00* (2013.01); *H04W 36/00* (2013.01); *Y02B 60/50* (2013.01)
USPC .......... 455/436; 455/67.1; 455/437; 455/438; 455/461

(58) Field of Classification Search
CPC .................. H04W 36/0055; H04W 36/0066; H04W 72/08
USPC ........................ 455/436, 67.1, 450, 56.1, 561
See application file for complete search history.

(56) References Cited

U.S. PATENT DOCUMENTS

| | | | |
|---|---|---|---|
| 2008/0189970 A1* | 8/2008 | Wang et al. | 33/701 |
| 2009/0264130 A1* | 10/2009 | Catovic et al. | 455/436 |
| 2010/0054237 A1* | 3/2010 | Han et al. | 370/350 |
| 2010/0113035 A1* | 5/2010 | Eskicioglu et al. | 455/444 |
| 2010/0267386 A1* | 10/2010 | Lim et al. | 455/436 |

* cited by examiner

*Primary Examiner* — Patrick Edouard
*Assistant Examiner* — Julio Perez

(57) ABSTRACT

An apparatus and a method for searching for an allowed femtocell in a wireless communication system. A method for providing neighbor base station information from a femto base station to a User Equipment (UE) allowed to access in a wireless communication system includes, when the allowed UE initially accesses or when the neighbor base station information of the femto base station is changed, generating a message comprising the neighbor base station information of the femto base station. The method also includes sending the generated message to the allowed UE.

16 Claims, 7 Drawing Sheets

APPARATUS AND METHOD FOR SEARCHING FOR AN ALLOWED FEMTOCELL IN WIRELESS COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Feb. 4, 2010, and assigned Serial No. 10-2010-0010312, the entire disclosure of which is hereby incorporated by reference.

TECHNICAL FIELD OF THE INVENTION

The present invention relates generally to an apparatus and a method for searching for an allowed femtocell in a wireless communication system. More particularly, the present invention relates to an apparatus and a method for a User Equipment (UE) allowed to access a femtocell, when it accesses a neighbor base station of the femtocell, to hand over by measuring the allowed femtocell.

BACKGROUND OF THE INVENTION

In a cellular wireless communication system, geographical conditions in a cell, a distance between a User Equipment (UE) and a base station, or movement of the UE may deteriorate a channel condition and block the communication between the UE and the base station. For example, even in the service coverage of the base station, a sealed structure such as office or house can form a shadow area. When the UE travels in such a shadow area, the base station cannot normally communicate with the UE because of the poor channel condition in relation to the UE.

In this respect, the wireless communication system can provide a femtocell service to address the service problem in the shadow area and to offer a high-rate data service. Hence, the femtocell indicates the service coverage of a compact base station which accesses a mobile communication core network via an indoor broadband network. The compact base station, which is installed in office or indoors to limit the access of the unauthorized user, can be called a self-configurable base station, a home base station, a femto base station, and a Closed Subscriber Group (CSG) base station. Hereinafter, the compact base station is referred to as the femto base station.

The femto base station works with a macro base station, and the UE may need to be serviced as it hands over between the femto base station and the macro base station. That is, the UE may need to be provided with improved service as it hands over between the macro base station and the femto base station according to the radio condition.

One macrocell can include a plurality of the femtocells. A Physical Cell ID (PCI), which is one type of ID for identifying the cell, can be duplicated for the macro cell and the femtocells, except for a specific PCI allocated only for the femtocell. Hence, when detecting the same PCI as the allowed femtocell through a cell search procedure during the movement, the UE cannot determine whether the detected PCI is the PCI allocated to the allowed femtocell and accordingly can hardly measure the cell corresponding to the detected PCI. This is a matter of great concern when only the UE allowed to access a particular femtocell is handed over to the corresponding femtocell. Thus, a Long Term Evolution (LTE) standard defines a Cell Global ID (CGI) which is the unique cell ID for identifying the femtocell, in addition to the PCI, and supports the mobility of the UE using the CGI.

Herein, a conventional method for the UE to report the PCI and the CGI to the macro base station and for the macro base station to support the mobility of the UE using the PCI and the CGI is discussed now.

The UE receives a Primary Synchronization Signal (PSS) and a Secondary Synchronization Signal (SSS) from its neighbor cell and obtains the PCI allocated to the neighbor cell. Since it is hard to identify the femtocell merely with the PCI, the UE receives a Master Information Block (MIB) and a System Information Block (SIB) from the corresponding neighbor cell and obtains the CGI which is the unique cell ID of the corresponding neighbor cell. Next, the UE generates a measurement report message including the PCI and the CGI obtained from the neighbor cells and sends the generated message to its serving macro base station. The serving macro base station determines based on the measurement report message whether the corresponding neighbor cell is the cell accessible by the UE, and instructs the UE to hand over to the corresponding neighbor cell according to the determination result.

As such, as the UE has to obtain the CGI of the neighbor cell because of the overlapping PCI, the measurement time for obtaining the PCI and the CGI is lengthened and thus the performance of the UE is deteriorated. In particular, when a number of femtocells are present around the UE, the UE may need to repeatedly receive the MIB and the SIB of each femtocell, which may degrade the performance of the UE even more.

SUMMARY OF THE INVENTION

To address the above-discussed deficiencies of the prior art, it is a primary aspect of the present invention to provide an apparatus and a method for searching for an allowed femtocell in a wireless communication system.

Another aspect of the present invention is to provide an apparatus and a method of a UE allowed to access a femtocell, for measuring the allowed femtocell and handing over to the femtocell when accessing a neighbor base station of the femtocell in a wireless communication system.

Yet another aspect of the present invention is to provide an apparatus and a method for collecting neighbor base station information after a femto base station is installed and, when an allowed UE initially accesses the femto base station or the neighbor base station information is changed, for sending the neighbor base station information to the allowed UE using an Automatic Neighbor Relation (ANR) message in a wireless communication system.

Still another aspect of the present invention is to provide an apparatus and a method of a UE allowed to access a femto base station. The method includes receiving an ANR message from the femto base station, collecting neighbor base station information of the femto base station based on the ANR message, and generating and storing a neighbor base station information list of the femto base station based on the collected neighbor base station information in a wireless communication system.

A further aspect of the present invention is to provide an apparatus and a method of a UE allowed to access a femto base station. The method includes handing over or reselecting a cell from a first base station (a macro base station or the femto base station) to the femto base station or for handing over or reselecting a cell from the femto base station to the first base station (the macro base station or the femto base station), and for including information of the first base station to a neighbor base station information list of the femto base station in a wireless communication system.

A further aspect of the present invention is to provide an apparatus and a method of a UE allowed to access a femto base station. The method includes measuring the femto base station based on a pre-stored neighbor base station information list of the femto base station when the UE accesses the neighbor base station in a wireless communication system.

A further aspect of the present invention is to provide an apparatus and a method of a UE allowed to access a femto base station which uses a different frequency from a neighbor base station. The method includes being assigned a measurement gap by sending to the neighbor base station a femtocell proximity indication to request the measurement gap for measuring the femto base station which uses the different frequency from the neighbor base station when the UE accesses the neighbor base station based on a pre-stored neighbor base station information list of the femto base station. The method also includes measuring the femto base station through the assigned measurement gap in a wireless communication system.

According to one aspect of the present invention, a method for providing neighbor base station information from a femto base station to a User Equipment (UE) allowed to access in a wireless communication system is provided. The method includes, when the allowed UE initially accesses or when the neighbor base station information of the femto base station is changed, generating a message comprising the neighbor base station information of the femto base station. The method also includes sending the generated message to the allowed UE.

According to another aspect of the present invention, a method for measuring a femto base station in a wireless communication system by a UE allowed to access the femto base station is provided. The method includes receiving, from the allowed femto base station, a message comprising neighbor base station information of the femto base station. The method also includes generating a neighbor base station information list of the femto base station based on the neighbor base station information. The method further includes, when accessing a neighbor base station of the femto base station, measuring the femto base station based on the generated neighbor base station information list.

According to yet another aspect of the present invention, an apparatus of a femto base station is provided. The apparatus is configured to provide neighbor base station information to a UE allowed to access in a wireless communication system. The apparatus includes a message generator configured, when the UE allowed to access initially accesses or when the neighbor base station information of the femto base station is changed, to generate a message comprising the neighbor base station information of the femto base station. The apparatus also includes a transmitter configured to send the generated message to the allowed UE.

According to still another aspect of the present invention, an apparatus of a UE allowed to access a femto base station is provided. The apparatus is configured to measure the femto base station. The apparatus includes a receiver configured to receive from the allowed femto base station, a message comprising neighbor base station information of the allowed femto base station. The apparatus also includes a neighbor base station information list manager configured to generate a neighbor base station information list of the femto base station based on the neighbor base station information. The apparatus further includes a measurement controller configured, when accessing a neighbor base station of the femto base station, to measure the femto base station based on the generated neighbor base station information list.

According to a further aspect of the present invention, a method for measuring a femto base station in a wireless communication system by a UE allowed to access the femto base station is provided. The method includes, when handing over or reselecting a cell from a first base station to the femto base station or when handing over or reselecting a cell from the femto base station to the first base station, generating a neighbor base station information list of the femto base station based on information of the first base station. The method also includes, when accessing the first base station belonging to the generated neighbor base station information list, measuring the femto base station.

According to a further aspect of the present invention, an apparatus for use in a UE allowed to access a femto base station in a wireless communication system is provided. The apparatus is configured to measure the femto base station. The apparatus includes a mobility controller configured, when handing over or reselecting a cell from a first base station to the femto base station or when handing over or reselecting a cell from the femto base station to the first base station, to obtain information of the first base station. The apparatus also includes a neighbor base station information list manager configured to generate a neighbor base station information list of the femto base station based on the obtained information of the first base station. The apparatus also includes a measurement controller configured, when accessing the first base station belonging to the generated neighbor base station information list, to measure the femto base station.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a technique for a User Equipment (UE) allowed to access a femtocell to measure the allowed femtocell and to hand over when the UE accesses a neighbor base station of the femtocell in a wireless communication system.

Hereinafter, while a Long Term Evolution (LTE) system is exemplified as the wireless communication system, the present invention is equally applicable in other wireless communication systems that include a femto base station.

Among the femtocells, a cell accessible by only the allowed UE is referred to as a Closed Subscriber Group (CSG) cell. A UE registered to the CSG cell and allowed to access is referred to as a CSG UE, and a base station accessible by only the CSG UE is referred to as a CSG base station.

Figure 1:
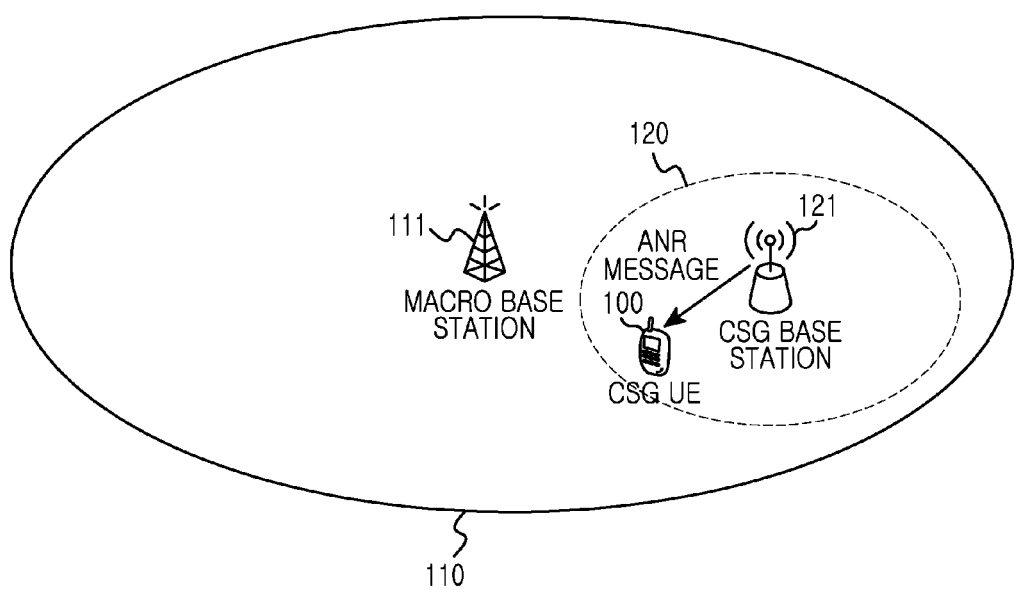
FIG. 1 illustrates a situation where a macro cell and a CSG cell coexist in a wireless communication system, according to an embodiment of the present invention.

FIG. 1 illustrates a situation where a macro cell and a CSG cell coexist in a wireless communication system according to an embodiment of the present invention.

In FIG. 1, a macro base station 111 manages one macro cell 110 and communicates with a UE having access to macro base station 111 within the macro cell 110. At least one CSG cell 120 can reside in the macro cell 110. A CSG base station 121 manages one CSG cell 120 and communicates with a CSG UE 100 having access to CSG base station 121 in the CSG cell 120. The CSG UE 100 indicates that the UE is registered to the CSG cell 120 and is allowed to access.

In addition to the typical functions, when the allowed CSG UE 100 initially accesses in the CSG cell 120 or when neighbor base station (including the macro base station and the femto base station) information of the CSG base station 121 is changed after the initial access, the CSG base station 121 sends the neighbor base station information to the CSG UE 100 using an Automatic Neighbor Relation (ANR) message. The CSG UE 100 obtains frequency and Physical Cell ID (PCI) and Cell Global ID (CGI) information of the neighbor base station using the received ANR message, and generates and stores a neighbor base station information list using the obtained information. Alternatively, the CSG UE 100 itself can obtain the neighbor base station information of the CSG base station 121. That is, when the CSG UE 100 hands over or reselects the cell from a certain base station (the macro base station or the femto base station) to the allowed CSG base station 121 or when the CSG UE 100 hands over or reselects the cell from the allowed CSG base station 121 to a certain base station, the CSG UE 100 can include information of the certain base station to the pre-stored neighbor base station information list.

Next, when the CSG UE 100 accesses the neighbor base station belonging to the neighbor base station information list, the CSG UE 100 measures the allowed CSG cell 120 based on the neighbor base station information list. In so doing, when the accessed neighbor base station and the allowed CSG cell 120 use different frequencies, the CSG UE 100 requests to allocate a measurement gap by sending a femtocell proximity indication to the accessed neighbor base station, and measures the allowed CSG cell 120 through the measurement gap allocated by the accessed neighbor base station.

When the CSG UE 100 sends a measurement report message including the measurement result to the accessed neighbor base station, the accessed neighbor base station can determine the handover of the CSG UE 100 based on the measurement report message. Accordingly, the CSG UE 100 can hand over to the allowed CSG cell 120.

Figure 2:
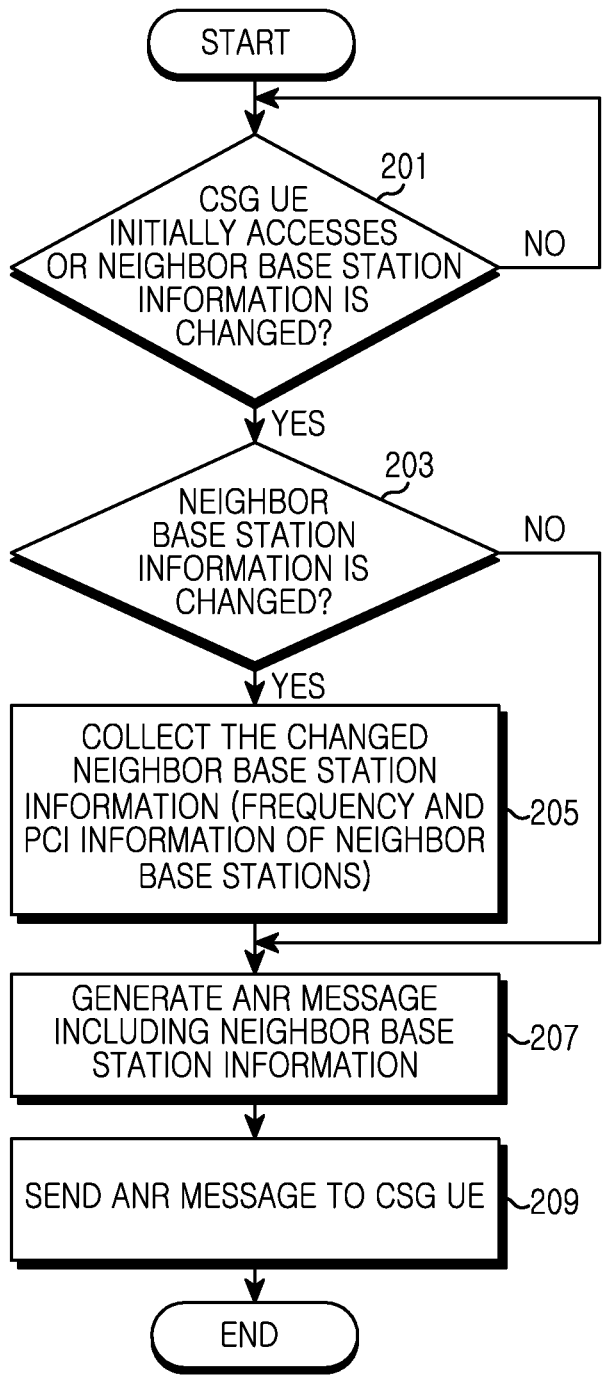
FIG. 2 illustrates a method at a CSG base station for providing neighbor base station information by sending an ANR message to an allowed CSG UE in the wireless communication system, according to an embodiment of the present invention.

FIG. 2 is a flowchart of a method at a CSG base station for providing the neighbor base station information by sending the ANR message to the allowed CSG UE in the wireless communication system according to an embodiment of the present invention.

In step 201, the CSG base station determines whether the allowed CSG UE initially accesses or whether the CSG base station is initially installed or the neighbor base station (including the macro base station and the femto base station) information of the CSG base station is changed.

Upon determining that the allowed CSG UE initially accesses or the neighbor base station information of the CSG base station is changed in step 201, the CSG base station determines whether the neighbor base station information of the CSG base station is changed in step 203.

Determining that the neighbor base station information of the CSG base station is changed in step 203, the CSG base station collects frequency and PCI information of the neighbor base stations as the changed neighbor base station information in step 205 and then goes to step 207. Herein, the changed neighbor base station information can be collected by using an install program when the CSG base station is initially installed, by exchanging information directly with the neighbor base station of the CSG base station over the backhaul (the backbone network), or through the allowed CSG UE using an existing ANR function. Herein, the existing ANR function updates the base station according to the generation of a new cell and a extinction of the existing cell, and is executed by the UE.

By contrast, when determining that the allowed CSG UE initially accesses, not that the neighbor base station information of the CSG base station is changed, in step 203, the CSG base station proceeds directly to step 207 by skipping the step 205.

Next, the CSG base station generates an ANR message including the neighbor base station information (i.e., the frequency and PCI information of the neighbor base stations) in step 207, and sends the generated ANR message to the allowed CSG UE in step 209. Herein, the ANR message generated and sent when the neighbor base station information of the CSG base station is changed, includes the changed neighbor base station information collected in step 205. The ANR message generated and sent when the allowed CSG UE initially accesses includes the neighbor base station information collected previously.

Next, the CSG base station finishes this process.

Figure 3:
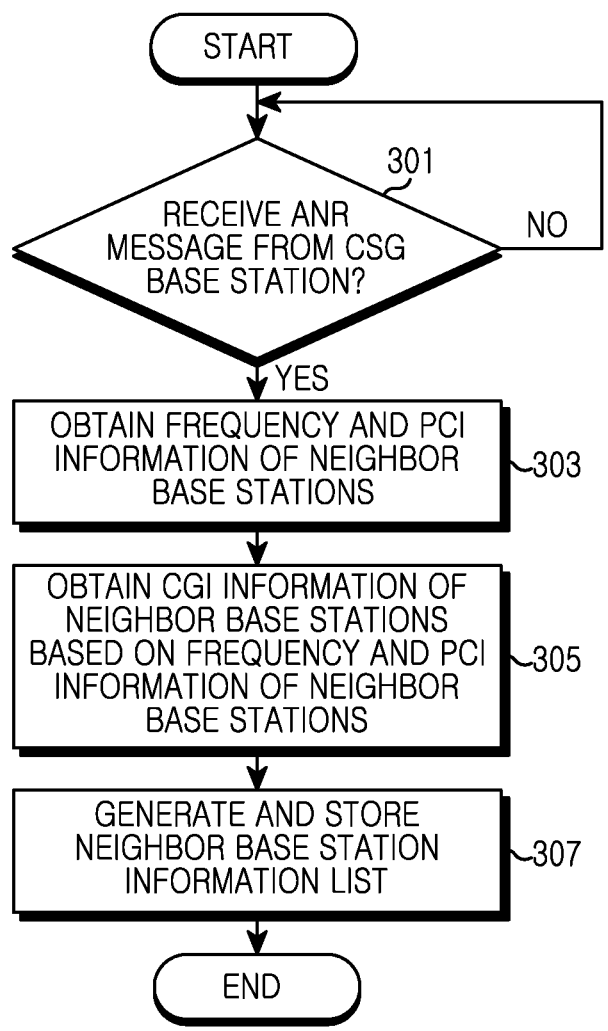
FIG. 3 illustrates a method, at a CSG UE allowed to access the CSG base station, for obtaining the neighbor base station information of the CSG base station by receiving the ANR message from the CSG base station, according to an embodiment of the present invention.

FIG. 3 is a flowchart of a method, at a CSG UE allowed to access the CSG base station, for obtaining the neighbor base station information of the CSG base station by receiving the ANR message from the CSG base station in the wireless communication system, according to an embodiment of the present invention.

In step 301, the CSG UE allowed to access the CSG base station determines whether the ANR message is received from the CSG base station. Herein, the ANR message includes the neighbor base station (including the macro base station and the femto base station) information (i.e., the frequency and PCI information of the neighbor base stations of the CSG base station).

Upon determining that the ANR message is received from the CSG base station in step 301, the CSG UE obtains the frequency and PCI information of the neighbor base stations from the received ANR message in step 303.

In step 305, the CSG UE obtains the CGI information of the neighbor base stations based on the obtained frequency and PCI information of the neighbor base stations. That is, the CSG UE searches for the neighbor cell of the PCI of the corresponding frequency, and acquires the CGI information of the corresponding neighbor base station by receiving a Master Information Block (MIB) and a System Information Block (SIB) from the searched neighbor cell.

In step 307, the CSG UE generates and stores a list of the neighbor base station information based on the obtained information.

Next, the CSG UE finishes this process.

Figure 4:
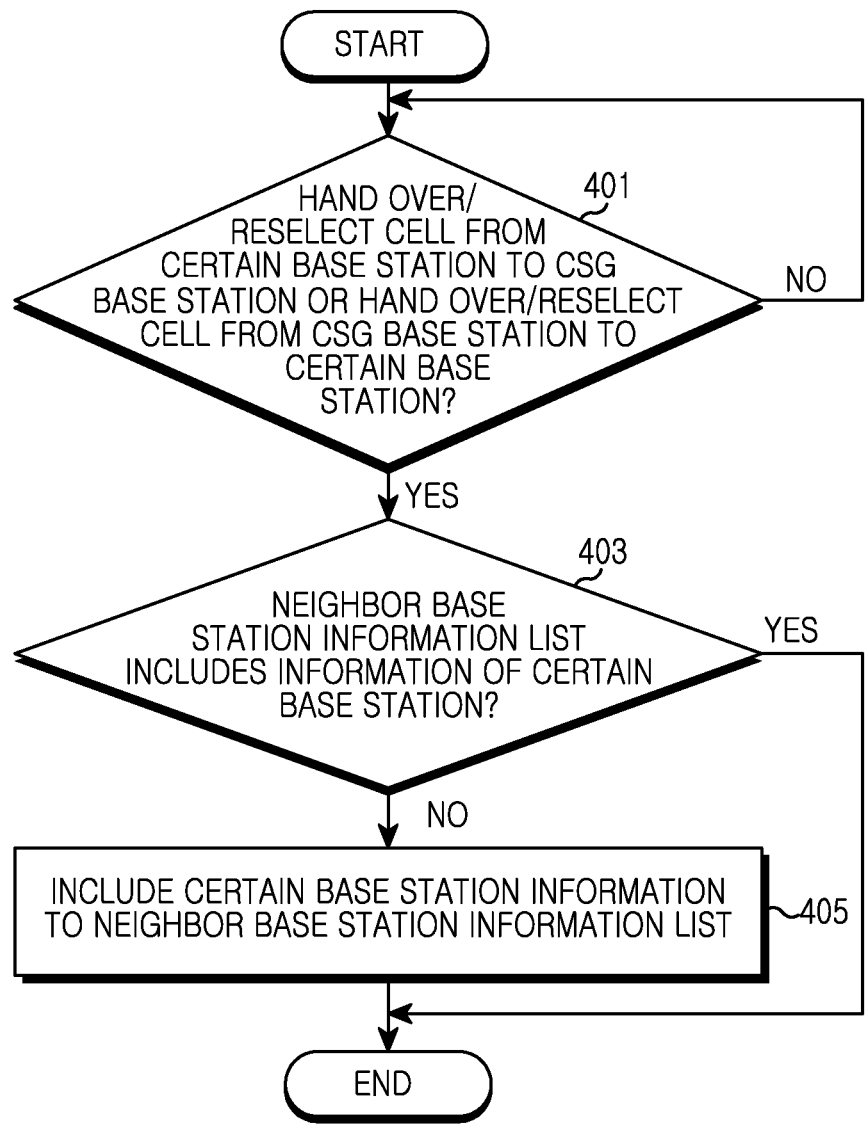
FIG. 4 illustrates a method, at the CSG UE allowed to access the CSG base station, for obtaining the neighbor base station information of the CSG base station by itself, according to an embodiment of the present invention.

FIG. 4 is a flowchart of a method, at the CSG UE allowed to access the CSG base station, for obtaining the neighbor base station information of the CSG base station by itself, according to an embodiment of the present invention.

In step 401, the CSG UE determines whether it hands over or reselects the cell from a certain base station (the macro base station or the femto base station) to the allowed CSG base station, or hands over or reselects the cell from the allowed CSG base station to a certain base station (the macro base station or the femto base station).

Determining the handover or the cell reselection from the certain base station (the macro base station or the femto base station) to the allowed CSG base station, or the handover or the cell reselection from the allowed CSG base station to a certain base station (the macro base station or the femto base station) in step 401, the CSG UE determines whether the information of the certain base station is contained in the pre-stored neighbor base station information list in step 403.

Upon determining that the information of the certain base station is contained in the pre-stored neighbor base station information list in step 403, the CSG UE finishes this process.

Determining that the information of the certain base station is not contained in the pre-stored neighbor base station information list in step 403, the CSG UE includes the certain base station information to the neighbor base station information list using the information obtained from the certain base station (i.e., the frequency, PCI and CGI information of the certain base station) in step 405.

Next, the CSG UE finishes this process.

Alternatively, while the methods for obtaining the neighbor base station information of FIGS. 3 and 4 can be applied as stated above, they can be applied in combination. In detail, the CSG UE allowed to access the CSG base station can obtain the neighbor base station information of the CSG base station by receiving the ANR message from the CSG base station as shown in FIG. 3, and simultaneously obtain the neighbor base station information of the CSG base station by itself as shown in FIG. 4.

Figure 5:
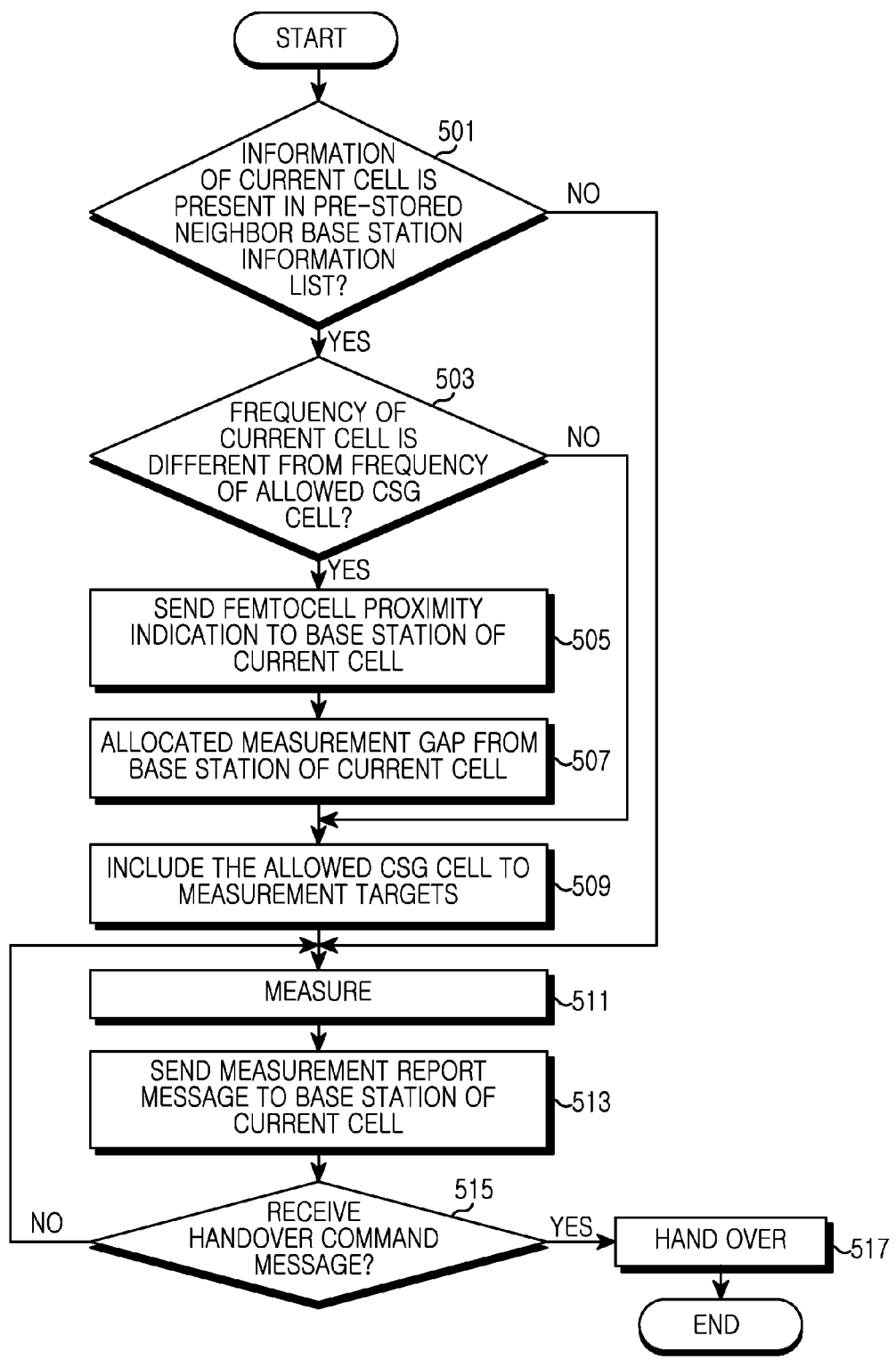
FIG. 5 illustrates a method, at the CSG UE allowed to access the CSG base station, for measuring a corresponding CSG cell using the obtained neighbor base station information of the CSG base station, according to an embodiment of the present invention.

FIG. 5 is a flowchart of a method, at the CSG UE allowed to access the CSG base station, for measuring the corresponding CSG cell using the obtained neighbor base station information of the CSG base station, according to an embodiment of the present invention.

In step 501, the CSG UE allowed to access the CSG base station determines whether the information of the current cell of the CSG UE is present in the pre-stored neighbor base station information list.

Determining that the information of the current cell of the CSG UE is present in the pre-stored neighbor base station information list in step 501, the CSG UE determines whether the frequency of the current cell of the CSG UE is different from the frequency of the allowed CSG cell in step 503.

Upon determining that the frequency of the current cell of the CSG UE is different from the frequency of the allowed CSG cell in step 503, the CSG UE sends the femtocell proximity indication to the base station of the current cell and thus requests the measurement gap allocation in step 505.

The CSG UE is allocated the measurement gap for measuring the allowed CSG base station, from the base station of the current cell in step 507, and then goes to step 509.

By contrast, determining that the frequency of the current cell of the CSG UE is the same as the frequency of the allowed CSG cell in step 503, the CSG UE proceeds to step 509 by skipping the steps 505 and 507. That is, the CSG UE goes straight to the step 509, without being allocated the separate measurement gap to measure the allowed CSG base station.

In step 509, the CSG UE includes the allowed CSG cell to the measurement targets.

Next, the CSG UE performs the general measurement and the handover in steps 511 through 517. More specifically, the CSG UE measures the target in step 511 and sends the measurement report message including the measurement result to the base station of the current cell in step 513. In step 515, the CSG UE determines whether a handover command message is received from the base station of the current cell. Upon receiving the handover command message from the base station of the current cell in step 515, the CSG UE hands over to the handover target base station as commanded by the base station of the current cell in step 517 and then finishes this process. By contrast, when not receiving the handover command message from the base station of the current cell in step 515, the CSG UE returns to step 511.

Determining that the information of the current cell of the CSG UE is not present in the pre-stored neighbor base station information list in step 501, the CSG UE goes to step 511. That is, the CSG UE conducts the general measurement and the handover.

Next, the CSG UE finishes this process.

Figure 6:
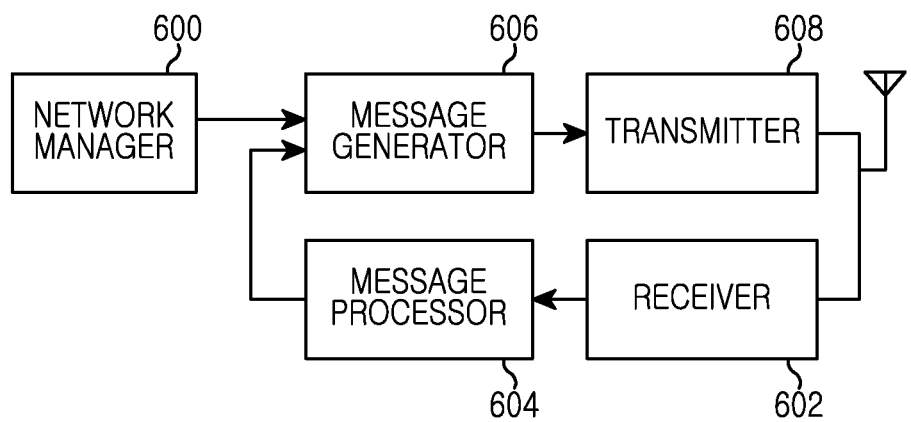
FIG. 6 illustrates the CSG base station in the wireless communication, system according to an embodiment of the present invention.

FIG. 6 is a block diagram of the CSG base station in the wireless communication system, according to an embodiment of the present invention.

The CSG base station of FIG. 6 includes a network manager 600, a receiver 602, a message processor 604, a message generator 606, and a transmitter 608.

The network manager 600 communicates with the other base stations (the macro base station and the femto base station) over the backhaul (the backbone network). In detail, the network manager 600 analyzes a backhaul message received from the other base station, generates and transmits a transmit backhaul message. The network manager 600 collects the neighbor base station information (the frequency and PCI information of the neighbor base stations) by exchanging information directly with the neighbor base stations (including the macro base station and the femto base station) of the CSG base station over the backhaul (the backbone network), and provides the collected neighbor base station information to the message generator 606.

The receiver 602 demodulates and decodes the signal received over an antenna, and provides the demodulated and decoded signal to the message processor 604.

The message processor 604 extracts information from the message output from the receiver 602 and provides the extracted information to the upper layer. The message processor 604 extracts the neighbor base station information from the message received from the CSG UE and provides the extracted neighbor base station information to the message generator 606.

The message generator 606 generates a message with the information received from the upper layer and sends the message to the transmitter 608. Herein, when the allowed CSG UE initially accesses or when the neighbor base station information of the CSG base station is changed, the message generator 606 generates the ANR message using the neighbor base station information collected through the install program when the CSG base station is installed, or through the network manager 600, or through the receiver 602 and the message processor 604, and provides the generated ANR message to the transmitter 608.

The transmitter 608 encodes and modulates the data output from the message generator 606, and transmits the data to the CSG UE over the antenna. In an embodiment, the transmitter 608 sends the ANR message output from the message generator 606, to the allowed CSG UE.

Figure 7:
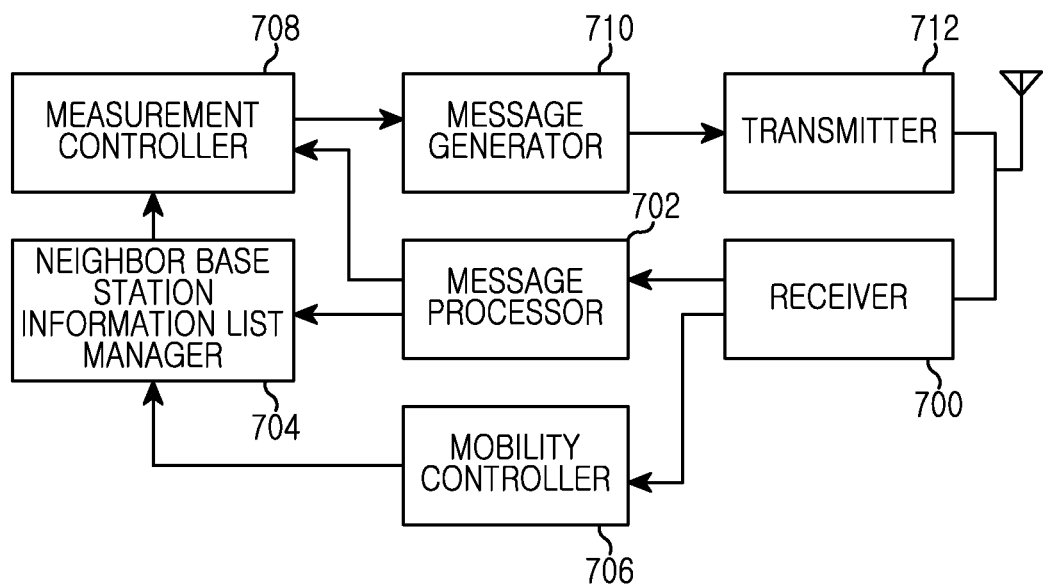
FIG. 7 illustrates the CSG UE in the wireless communication system, according to an embodiment of the present invention.

FIG. 7 is a block diagram of the CSG UE in the wireless communication system, according to an embodiment of the present invention.

The CSG UE of FIG. 7 includes a receiver 700, a message processor 702, a neighbor base station information list manager 704, a mobility controller 706, a measurement controller 708, a message generator 710, and a transmitter 712.

The receiver 700 demodulates and decodes the signal received over an antenna, and provides the demodulated and decoded signal to the message processor 702.

The message processor 702 extracts information from the message output from the receiver 700 and provides the extracted information to the upper layer. The message processor 702 extracts the neighbor base station information; that is, the frequency and PCI information of the neighbor base stations from the ANR message received from the CSG base station, obtains the CGI information of the neighbor base stations based on the extracted frequency and PCI information of the neighbor base stations, and provides the information to the neighbor base station information list manager 704.

The neighbor base station information list manager 704 generates and stores the neighbor base station information list using the frequency, PCI, and CGI information of the neighbor base stations provided from the message processor 702. Alternatively, according to whether the frequency, PCI and CGI information of the certain base station provided from the mobility controller 706 is contained in the pre-stored neighbor base station information list, the neighbor base station information list manager 704 updates the neighbor base station information list by including the frequency, PCI and CGI information of the certain base station to the pre-stored neighbor base station information list.

The mobility controller 706 detects the handover or the cell reselection from the certain base station (the macro base station or the femto base station) to the allowed CSG base station, or the handover or the cell reselection from the allowed CSG base station to the certain base station (the macro base station or the femto base station). According to the detection result, the mobility controller 706 provides the neighbor base station information list manager 704 with the certain base station information (i.e., the frequency, PCI, and CGI information of the certain base station extracted from the message received from the certain base station). Hence, the neighbor base station information list manager 704 can update the neighbor base station information list if necessary.

Based on the information received via the receiver 700 and the message processor 702, the measurement controller 708 detects whether the CSG UE is accessing to the neighbor base station (that is, the neighbor base station of the CSG base station) belonging to the neighbor base station information list. According to the detection result, the measurement controller 708 includes the allowed CSG cell to the measurement targets and measures the allowed CSG cell. In so doing, when the frequency of the detected neighbor base station (that is, the neighbor base station of the CSG base station) differs from the frequency of the allowed CSG cell, the measurement controller 708 controls the message generator 710 to generate the femtocell proximity indication. The generated femtocell proximity indication is sent to the detected neighbor base station through the transmitter 712. When the measurement gap for measuring the allowed CSG cell is allocated from the detected neighbor base station through the receiver 700 and the message processor 702, the measurement controller 708 measures over the allocated measurement gap. Also, the measurement controller 708 provides the measurement result to the message generator 710 and controls the message generator 710 to generate the measurement report message including the measurement result. The generated measurement report message is sent to the detected neighbor base station through the transmitter 712. Hence, upon receiving the handover command message from the detected neighbor base station via the receiver 700 and the message processor 702, a handover controller (not shown) hands over to the target base station.

The message generator 710 generates a message with the information provided from the upper layer and outputs the message to the transmitter 712. Under the control of the measurement controller 708, the message generator 710 generates and outputs the femtocell proximity indication to the transmitter 712. When receiving the measurement result from the measurement controller 708, the message generator 710 generates the measurement report message including the measurement result and outputs the generated message to the transmitter 712.

The transmitter 712 encodes and modulates the data output from the message generator 710, and sends the data over the antenna.

As stated above, in the wireless communication system, the femto base station provides the neighbor base station information to the allowed UE using the ANR message, and the UE allowed to access the femto base station measures only the allowed femto base station when it is accessing the neighbor base station and hands over from the neighbor base station to the femto base station. Therefore, it is possible to minimize the power consumption lost in unnecessary measurements and to hand over at the appropriate time. Further, when the frequency of the neighbor base station is different from the frequency of the allowed femto base station, the allowed UE sends the femtocell proximity indication to the neighbor base station and performs the measurement by receiving the allocated measurement gap for the corresponding femto base station. Consequently, the resource efficiency of the neighbor base station can be enhanced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for measuring a neighbor base station in a wireless communication system by a User Equipment (UE) to access the neighbor base station, the method comprising:
   receiving, from a femto base station, a message comprising neighbor base station information of the femto base station;
   generating a neighbor base station information list of the femto base station based on the neighbor base station information;
   determining whether information of the neighbor base station is present in the neighbor base station information list; when the information of the neighbor base station is present in the neighbor base station information list and when accessing the neighbor base station of the femto base station based on the generated neighbor base station information list, determining whether a frequency of the femto base station is different from a frequency of the neighbor base station; when the frequency of the femto base station is different from the frequency of the neighbor base station, requesting to allocate a measurement gap by sending a proximity indication to the femto base station; receiving an allocation of the measurement gap from the femto base station to measure the neighbor base station; and measuring the neighbor base station based on the allocated measurement gap.

2. The method of claim 1, wherein the neighbor base station information comprises at least one of the frequency and a Physical Cell ID (PCI) of one or more neighbor base stations.

3. The method of claim 1, wherein the neighbor base station comprises at least one of a macro base station and a femto base station.

4. The method of claim 1, wherein the message is an Automatic Neighbor Relation (ANR) message.

5. The method of claim 1, further comprising:
   when handing over or reselecting a cell from the femto base station to the neighbor base station, including information of the femto base station to the generated neighbor base station information list of the femto base station.

6. An apparatus of a User Equipment (UE) to access a neighbor base station in a wireless communication system, the apparatus configured to measure the neighbor base station, the apparatus comprising:
   a receiver configured to receive, from the femto base station, a message comprising neighbor base station information of the femto base station;
   a neighbor base station information list manager configured to generate a neighbor base station information list of the femto base station based on the neighbor base station information and to determine whether information of the neighbor base station is present in the neighbor base station information list; and
   a measurement controller configured, when accessing a neighbor base station of the femto base station based on the generated neighbor base station information list, to determine whether a frequency of the femto base station is different from a frequency of the neighbor base station; when the information of the neighbor base station is present in the neighbor base station information list and when the frequency of the femto base station is different from the frequency of the neighbor base station, to request allocation of a measurement gap by sending a proximity indication to the femto base station, to receive an allocation of the measurement gap from the femto base station to measure the neighbor base station, and to measure the neighbor base station based on the allocated measurement gap.

7. The apparatus of claim 6, wherein the neighbor base station information comprises at least one of the frequency and a Physical Cell ID (PCI) of one or more neighbor base stations.

8. The apparatus of claim 6, wherein the neighbor base station comprises at least one of a macro base station and a femto base station.

9. The apparatus of claim 6, wherein the message is an Automatic Neighbor Relation (ANR) message.

10. The apparatus of claim 6, further comprising:
    a mobility controller configured, when handing over or reselecting a cell from the femto base station to the neighbor base station, to obtain information of the femto base station, wherein the neighbor base station information list manager is further configured to include the obtained information of the femto base station to the generated neighbor base station information list of the femto base station.

11. A method for measuring a neighbor base station in a wireless communication system by a User Equipment (UE) to access the neighbor base station, the method comprising:
    when handing over or reselecting a cell from the femto base station to the neighbor base station, generating a neighbor base station information list of the femto base station based on information of the neighbor base station;
    determining whether information of the neighbor base station is present in the neighbor base station information list;
    when the information of the neighbor base station is present in the neighbor base station information list and when accessing the neighbor base station belonging to the generated neighbor base station information list, determining whether a frequency of the femto base station is different from a frequency of the neighbor base station;
    when the frequency of the femto base station is different from the frequency of the neighbor base station, requesting to allocate a measurement gap by sending a proximity indication to the femto base station; receiving an allocation of the measurement gap from the femto base station to measure the neighbor base station; and measuring the neighbor base station based on the allocated measurement gap.

12. An apparatus for use in a User Equipment (UE) to access a neighbor base station in a wireless communication system, the apparatus configured to measure the neighbor base station, the apparatus comprising:
    a mobility controller configured, when handing over or reselecting a cell from the femto base station to the neighbor base station, to obtain information of the neighbor base station; a neighbor base station information list manager configured to generate a neighbor base station information list of the femto base station based on the obtained information of the neighbor base station and to determine whether information of the neighbor base station is present in the neighbor base station information list; and a measurement controller configured, when the information of the neighbor base station is present in the neighbor base station information list and when accessing the neighbor base station belonging to the generated neighbor base station information list, to determine whether a frequency of the femto base station is different from a frequency of the neighbor base station; when the frequency of the femto base station is different from the frequency of the neighbor base station, to request allocation of a measurement gap by sending a proximity indication to the femto base station; to receive an allocation of the measurement gap from the femto base station to measure the neighbor base station; and to measure the neighbor base station based on the allocated measurement gap.

13. A method for operating a femto base station in a wireless communication system including the femto base station, a neighbor base station neighbored by the femto base station, and a User Equipment (UE) to access the neighbor base station, the method comprising:

when accessing the neighbor base station of the femto base station based on a neighbor base station information list, receiving, from the UE, a proximity indication to request to allocate a measurement gap; and allocating the measurement gap for the UE to measure the neighbor base station, wherein the femto base station receives the proximity indication from the UE when a frequency of the femto base station is different from a frequency of the neighbor base station, and wherein the UE determines whether information of the neighbor base station is present in a neighbor base station information list, and when the information of the neighbor base station is present in the neighbor base station information list, determines whether the frequency of the femto base station is different from the frequency of the neighbor base station.

14. The method of claim 13, wherein the neighbor base station information list is generated based on a message comprising neighbor base station information, and wherein the message is received from the femto base station.

15. An apparatus of a femto base station in a wireless communication system including the femto base station, a neighbor base station neighbored by the femto base station, and a User Equipment (UE) to access the neighbor base station, the apparatus comprising:

a receiver configured to receive, from the UE, a proximity indication to request to allocate a measurement gap, when accessing the neighbor base station of the femto base station based on a neighbor base station information list; and a network manager configured to allocate the measurement gap for the UE to measure the neighbor base station, wherein the receiver is configured to receive the proximity indication from the UE when a frequency of the femto base station is different from a frequency of the neighbor base station, wherein the UE is configured to determine whether information of the neighbor base station is present in a neighbor base station information list, and when the information of the neighbor base station is present in the neighbor base station information list, determine whether the frequency of the femto base station is different from the frequency of the neighbor base station.

16. The apparatus of claim 15, wherein the neighbor base station information list is generated based on a message comprising neighbor base station information, and wherein the message is received from the femto base station.

* * * * *